US010134395B2

(12) United States Patent
Typrin

(10) Patent No.: US 10,134,395 B2
(45) Date of Patent: Nov. 20, 2018

(54) IN-CALL VIRTUAL ASSISTANTS

(71) Applicant: Amazon Technologies, Inc., Seattle, WA (US)

(72) Inventor: Marcello Typrin, Menlo Park, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/037,077

(22) Filed: Sep. 25, 2013

(65) Prior Publication Data
US 2015/0088514 A1 Mar. 26, 2015

(51) Int. Cl.
G10L 17/00 (2013.01)
G10L 15/22 (2006.01)
G06F 3/16 (2006.01)
H04M 3/493 (2006.01)

(52) U.S. Cl.
CPC .......... G10L 15/22 (2013.01); G06F 3/167 (2013.01); G10L 17/00 (2013.01); H04M 3/493 (2013.01); G10L 2015/223 (2013.01); H04M 2203/355 (2013.01); H04M 2203/357 (2013.01)

(58) Field of Classification Search
CPC ....................................................... G10L 17/00
See application file for complete search history.

(56) References Cited

U.S. PATENT DOCUMENTS 5,983,186 A * 11/1999 Miyazawa ............ G10L 15/26
704/233
6,757,362 B1 * 6/2004 Cooper ................ H04M 3/527
379/88.01
6,963,759 B1 * 11/2005 Gerson ...................... 455/563
7,124,300 B1 * 10/2006 Lemke ................ G06F 21/32
340/5.53
7,418,392 B1 8/2008 Mozer et al.
7,720,683 B1 5/2010 Vermeulen et al.
7,774,204 B2 8/2010 Mozer et al.
(Continued)

FOREIGN PATENT DOCUMENTS

CN 102177541 A 9/2011
EP 1202540 5/2002
(Continued)

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.
(Continued)

Primary Examiner — Richemond Dorvil
Assistant Examiner — Bryan S Blankenagel
(74) Attorney, Agent, or Firm — Lee & Hayes, PLLC

(57) ABSTRACT

Techniques for providing virtual assistants to assist users during a voice communication between the users. For instance, a first user operating a device may establish a voice communication with respective devices of one or more additional users, such as with a device of a second user. For instance, the first user may utilize her device to place a telephone call to the device of the second user. A virtual assistant may also join the call and, upon invocation by a user on the call, may identify voice commands from the call and may perform corresponding tasks for the users in response.

20 Claims, 5 Drawing Sheets

(56) References Cited

U.S. PATENT DOCUMENTS

| | | |
|---|---|---|
| 8,386,261 B2 | 2/2013 | Mellott et al. |
| 8,457,960 B2 | 6/2013 | Srivastava et al. |
| 8,743,743 B1* | 6/2014 | Mai ................... H04M 3/566 |
| | | 370/260 |
| 9,893,902 B2* | 2/2018 | Vander Mey ....... H04L 12/1822 |
| 2003/0068027 A1* | 4/2003 | Dodla .................. H04M 15/00 |
| | | 379/190 |
| 2004/0038673 A1* | 2/2004 | Dunn .................... H04M 3/436 |
| | | 455/417 |
| 2004/0062373 A1* | 4/2004 | Baker ................. H04M 3/4931 |
| | | 379/218.01 |
| 2005/0286711 A1 | 12/2005 | Lee et al. |
| 2006/0036442 A1* | 2/2006 | Novack et al. ............... 704/273 |
| 2007/0249406 A1 | 10/2007 | Andreasson |
| 2008/0015864 A1* | 1/2008 | Ross et al. .................... 704/275 |
| 2008/0247530 A1* | 10/2008 | Barton ................. H04M 3/382 |
| | | 379/216.01 |
| 2008/0275701 A1 | 11/2008 | Wu et al. |
| 2008/0300886 A1* | 12/2008 | Patch ............................ 704/275 |
| 2009/0018835 A1* | 1/2009 | Cooper et al. ................ 704/257 |
| 2011/0228919 A1* | 9/2011 | Tew ........................ H04M 3/38 |
| | | 379/93.12 |
| 2012/0062370 A1 | 3/2012 | Feldstein et al. |
| 2012/0116774 A1* | 5/2012 | Forsell ................ A61N 1/37217 |
| | | 704/270 |
| 2012/0223885 A1 | 9/2012 | Perez |
| 2012/0245944 A1* | 9/2012 | Gruber et al. ............. 704/270.1 |
| 2012/0262533 A1 | 10/2012 | Gannu et al. |
| 2012/0265528 A1* | 10/2012 | Gruber ................... G10L 15/18 |
| | | 704/235 |
| 2013/0051543 A1* | 2/2013 | McDysan ........... H04M 3/4286 |
| | | 379/202.01 |

FOREIGN PATENT DOCUMENTS

| | | | |
|---|---|---|---|
| EP | 1202540 A2 * | 5/2002 | ............. H04M 1/27 |
| JP | H07327081 | 12/1995 | |
| JP | 2002204289 | 7/2002 | |
| JP | 2003032388 | 1/2003 | |
| JP | 2010109618 | 5/2010 | |
| WO | WO0126394 | 4/2001 | |
| WO | WO2011088053 A2 | 7/2011 | |
| WO | WO2012063260 | 5/2012 | |
| WO | WO2013013290 | 1/2013 | |

OTHER PUBLICATIONS

PCT Search Report and Written Opinion dated Dec. 12, 2014 for PCT Application No. PCT/US14/56739, 8 Pages.

The Extended European Search Report dated Apr. 24, 2017 for European Patent Application No. 14850015.0, 7 pages.

The Japanese Office Action dated Mar. 28, 2017 for Japanese Patent Application No. 2016-544045, a counterpart foreign application of U.S. Appl. No. 14/037,077, 13 pages.

The Japanese Office Action dated Dec. 12, 2017 for Japanese Patent Application No. 2016-544045, a counterpart foreign application of U.S. Appl. No. 14/037,077, 5 pages.

The Chinese Office Action dated May 2, 2018 for Chinese Patent Application No. 201480052266.9, a counterpart foreign application of U.S. Appl. No. 14/037,077, 24 pgs.

* cited by examiner

IN-CALL VIRTUAL ASSISTANTS

BACKGROUND

Voice-communication systems allow users that are remote from one another to communicate over an array of different devices. Some devices, such as mobile telephones, send voice data over networks to end-user devices. Other devices, such as laptop computers or tablets configured with webcams, send both voice and video data to end-user devices. Regardless of whether users communicate solely using audio or using both audio and video, these voice-communication systems increase connectedness amongst large populations of users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
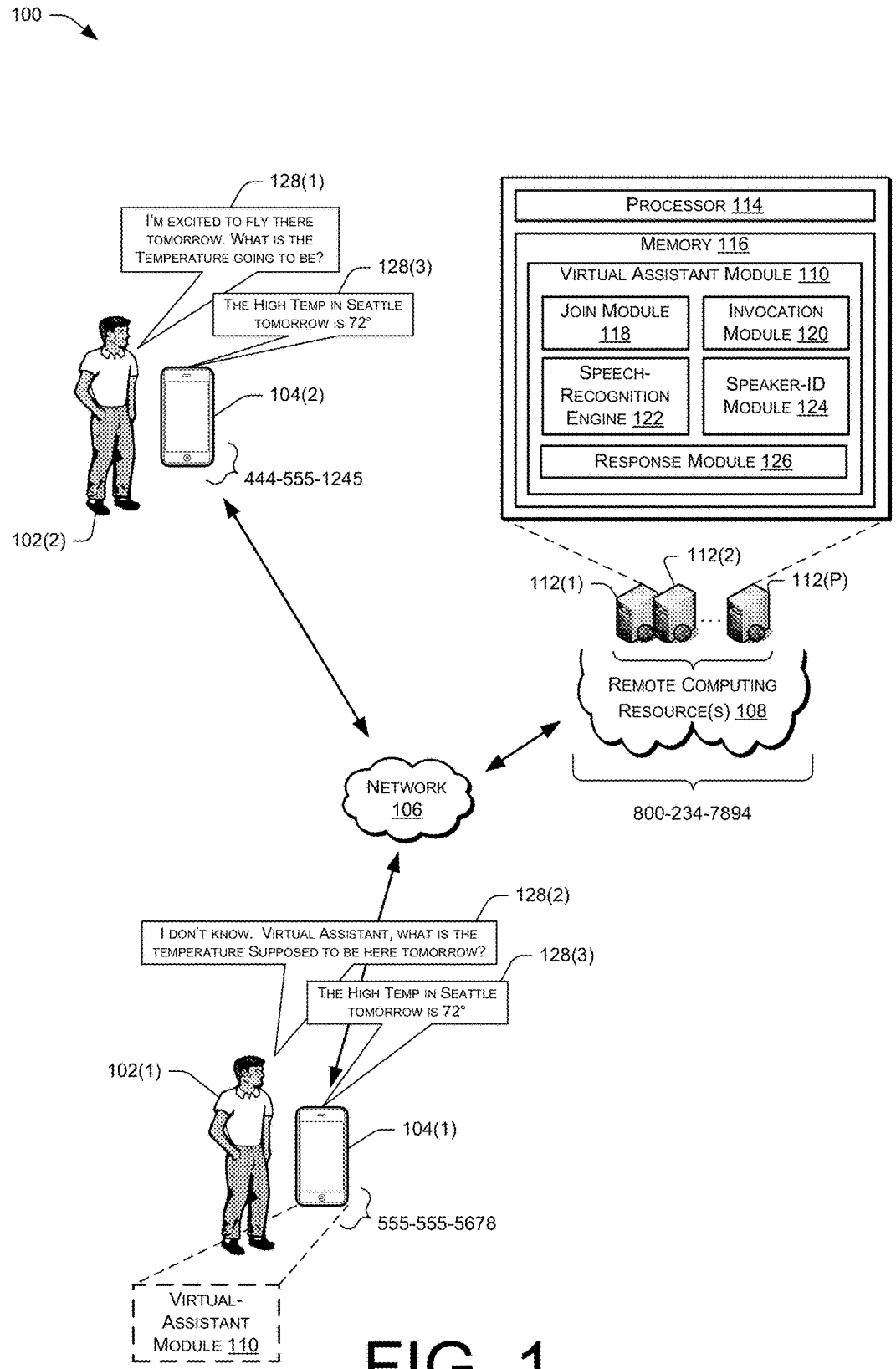
FIG. 1 shows an illustrative computing architecture that includes a first user using a device to establish a voice communication with a device of a second user. The architecture also includes a virtual assistant module that implements a virtual assistant configured to be invoked by the first or second user and, in response, identify a voice command from the invoking user and perform a corresponding task in response.

This disclosure describes, in part, techniques for providing virtual assistants to assist users during voice communications between the users. For instance, a first user operating a device may establish a voice communication with respective devices of one or more additional users, such as with a device of a second user. For instance, the first user may utilize her device to place a telephone call or other voice communication to the device of the second user. This communication may be initiated via a public switched telephone network (PSTN), a cellular network, a voice-over-internet-protocol (VOIP) network, or the like.

After establishing the voice communication, or as part of establishing this communication, the techniques may join another computing device to the voice communication, namely a computing device that hosts a virtual assistant for performing tasks for one or both users. For instance, the users may inquire, during the voice communication, a temperature forecast for a particular area, may ask the virtual assistant to schedule a meeting or purchase movie tickets, or the like. After identifying the voice command from an audio signal representing the audio of the voice communication, the virtual assistant may obtain information pertaining to the voice command and may output the information to the user, either via the voice communication or via an out-of-band communication. For instance, if a user asks the virtual assistant for a current temperature, the computing device hosting the virtual assistant may use automatic speech recognition to identify the voice command and may thereafter obtain the information (i.e., the current temperature at the location of the user) and may use text-to-speech to output the current temperature to the users taking part in the telephone call. Additionally or alternatively, the computing device hosting the virtual assistant may provide this information via another channel, such as via text message, email, or any other type of push-notification service or protocol.

After joining the virtual assistant to a voice communication, one or both of the users on the voice communication may invoke the virtual assistant when the respective user desires the assistance of the virtual assistant. A user may invoke the assistant in a number of ways. For instance, a user may speak a predefined utterance (e.g., word, phrase, sound, or a combination thereof) that, when identified by the computing device hosting the virtual assistant, causes the computing device to begin performing speech recognition on an audio signal representing the audio of the voice communication for the purpose of identifying a voice command. For instance, when the virtual assistant is on the voice communication but not invoked, the virtual assistant may simply monitor an audio signal representing the audio of the voice communication for the predefined utterance, but might not perform further speech recognition on the audio signal representing the audio. Upon identifying a keyword match (or a similarity between a stated word or phrase and the predefined utterance that is greater than a threshold), the virtual assistant may begin performing speech recognition on the audio signal representing the audio of the voice communication to identify subsequent voice commands.

In other instances, meanwhile, a user on the telephone call may invoke the virtual assistant in a number of one or more other ways. For instance, the user may invoke the assistant by selecting a predefined soft button or physical button on a device of the user (e.g., a pound (#) symbol on the device's keypad), by moving the device in a predefined manner (as determined by an accelerometer or gyroscope of the device), or the like. In still other instances, a virtual assistant may be invoked in response to one or more other triggers, such as the placing of a phone call to a particular user, based on a current geo-location of one or more both users, or the like.

In any event, after the virtual assistant is invoked, the virtual assistant may be begin performing speech recognition to identify a voice command and may attempt to identify a user that is providing the command. The virtual assistant may identify this user in any number of ways. For instance, the virtual assistant may utilize the information provided by the communications network (e.g., the PSTN, cellular network, etc.). This information may include an automatic number identification (ANI) indicating a telephone number associated with a device that initiated the voice communication or a called party number (CPN) indicating a telephone number associated with a device that received the telephone call. The virtual assistant may look up either or both of these phone numbers and may map these numbers to a user. Thereafter, the virtual assistant may use this identification in performing a task requested by a user. For instance, if the user asks "what is the temperature outside", the virtual assistant may reference a user profile associated with the user for the purpose of determining a currently current location of the user and a current temperature at that location. In another example, if a user asks to "please schedule a meeting between us (the people on the call)", the virtual assistant may reference calendars associated with the people on the telephone call to determine a time and location sufficient for such a meeting.

In addition or in the alternative to using the information provided by the communications network, the virtual assistant may use voice recognition techniques to identify an invoking user. For instance, users may initially "enroll" their voice prints or signatures with the virtual assistant such that this voice print may be subsequently used to identify users based on characteristics of their speech. For instance, the virtual assistant may compare speech characteristics of an invoking user to corresponding characteristics of one or more stored voice signatures to identify the invoking user. These speech characteristics that define a user's "voice signature" may include pitch, tone, frequency, amplitude, grammar, or any other audio characteristic.

In yet another example, the virtual assistant may determine the identity of the user by engaging in a dialog with the user. For instance, the virtual assistant may request that the user state his or her name along with a password, an answer to a secret question, or the like. In some instances, the virtual assistant may reside on a telephony service, or may interact with the telephony service, such that the virtual assistant may place the leg of the call with the non-invoking user on bi-directional mute while the invoking user states his or her password. Of course, the virtual assistant may also work with the invoking user in an out-of-band channel to identify and authenticate the user. For instance, upon the invoking user stating his or her name, the virtual assistant may identify a phone number, email address, or the like associated with the user and may send a communication to that number or address, asking the user to confirm his or her identity. Upon authenticating with the virtual assistant, the virtual assistant may perform the actions requested by the user.

After identifying a voice command and the identity of the requesting user (and/or the identity of the user on the other end of the call), the virtual assistant may determine an action to perform in response, which may include providing an output audio signal effective to output some audible content to the user(s) during the telephone call. For instance, the output may include informing the users of a current temperature, indicating that a meeting has been scheduled, confirming that the virtual assistant has purchased requested movie tickets for the invoking user at the requested time using the user's payment information, or the like. Furthermore, after performing the action, the virtual assistant may transition back from the "active" mode into a "standby" mode where the virtual assistant remains on the call but awaiting invocation. That is, the virtual assistant may monitor an audio signal representing the audio for the predefined utterance that, when recognized, invokes the assistant, but the assistant otherwise does not perform speech recognition on the audio signal representing the audio of the voice communication.

As used herein, a virtual assistant comprises any one or combination of software, hardware, or firmware configured to interact with one or more users during a telephone communication between the users. In some instances, a virtual assistant comprises functionality for performing speech recognition on audio between the users of the voice communication and/or functionality for performing an action in response. In addition or in the alternative, a virtual assistant may output information to one or both of the users (or more users if more than two are taking part in the voice communication). This information may be output as part of the voice communication and/or may be output in an out-of-band channel (e.g., over email, a text message, or the like). In some instances, a virtual assistant outputs this information audibly (e.g., impersonating a human voice during the voice communication), textually (e.g., over email or a text message), or in any other manner.

The devices and techniques introduced above may be implemented in a variety of different architectures and contexts. One non-limiting and illustrative implementation is described below.

FIG. 1 shows an illustrative computing architecture 100 that includes a first user 102(1) using a device 104(1) to establish a voice communication with a device 104(2) of a second user 102(2) over a network 106. The devices 104(1) and 104(2) may comprise any sort of computing device capable of maintaining a voice communication between one another, such as cellular telephones, smart phones, tablet computing devices, desktop computers, game consoles, or any other type of device executing an application enabling these devices to establish such a communication. As used herein, a "voice communication" includes any type of communication in which audio is transferred between the user devices, including voice-only communications, audio/video communications, and the like. The network 106, meanwhile, may comprise any one or a combination of wired or wireless networks for providing voice data between the user devices. For instance, the network 106 may comprise a PSTN, a VoIP network, or the like.

As illustrated, the architecture 100 may also include one or more remote computing resources 108 that may host a virtual assistant module 110, which implements a virtual assistant configured for invocation by the first user 102(1) or the second user 102(2). In response to one of these users invoking the virtual assistant during a voice communication, the virtual assistant module 110 may identify a voice command from the invoking user and perform a corresponding task in response.

As illustrated, the remote computing resources 108 may be implemented as one or more servers 112(1), 112(2), . . . , 112(P) and may, in some instances, form a portion of a network-accessible computing platform implemented as a computing infrastructure of processors, storage, software, data access, and so forth that is maintained and accessible via a network such as the Internet. The remote computing resources 108 do not require end-user knowledge of the physical location and configuration of the system that delivers the services. Common expressions associated for these remote computing resources 108 include "on-demand computing", "software as a service (SaaS)", "platform computing", "network-accessible platform", "cloud services", "data centers", and so forth. In some implementations, the remote computing resources 108 may form all or a portion of a telephony service that functions to establish a voice communication (e.g., phone call) between user devices and that hosts a virtual assistant for assisting in the voice communication.

The servers 112(1)-(P) may include processor(s) 114 and memory 116, which stores the virtual-assistant module 110. As illustrated, the virtual assistant module 110 stores or otherwise has access to a join module 118, an invocation module 120, a speech-recognition engine 122, a speaker-identification (ID) module 124, and a response module 126. The join module 118 functions to join the virtual assistant functionality (i.e., the components of the module 110) to a voice communication between the example user devices 104(1) and 104(2). As FIG. 1 illustrates, both user devices 104(1) and 104(2) may be associated with a particular telephone number or other endpoint identifier at which the device may be reachable. Furthermore, FIG. 1 illustrates that the computing resources 108 hosting the virtual assistant module 110 may also be associated with a telephone number (here, "800-234-7894"). As such, the join module 118 may allow the virtual assistant module 110 to join a voice communication upon a device dialing this number and conferencing in the computing resource(s) hosting the virtual assistant module 110. Of course, while FIG. 1 illustrates that the computing resources 108 and the respective client devices 104 are associated with telephone numbers, these devices may be associated with and reachable at an array of other endpoint identifiers, such as uniform resources identifiers (URIs), VoIP endpoint identifiers, session initiation protocol (SIP) identifiers, or the like.

In the illustrated example, upon the user 102(1) using the device 104(1) to dial the number associated with the device 104(2), an application running on the device 104(1) may automatically dial the number associated with the virtual assistant module 110 for joining the module 110. For instance, FIG. 1 illustrates that the device 104(1) may include the virtual assistant module 110 for automatically dialing this number. In another example, meanwhile, the user 102(1) and/or the user 102(2) may manually conference in the computing resources 108 by adding a party to the voice communication and dialing the number associated with the computing resources 108. In either instance, the virtual assistant module 110 may receive an indication of an incoming phone call and may "answer" the incoming call to join the call.

After the virtual assistant module 110 joins the call, the invocation module 120 may monitor for a trigger to invoke other components of the module 110, such as the speech-recognition engine 122. For instance, the invocation module 120 may seek to identify a predefined utterance spoken by one or both of the users and, upon identifying this predefined utterance, may invoke the speech-recognition engine 122. In other examples, the invocation module 120 may await a text message or other communication from a user to invoke the components of the virtual assistant module 110.

After receiving a request to invoke these components, the invocation module may invoke the speech-recognition engine 122. The speech-recognition engine 122 performs speech recognition on audio signals generated based on sound captured by the microphone of the user devices 104(1) and 104(2), such as utterances spoken by the users 102(1) and 102(2). The speaker-ID module 124, meanwhile, may identify an identity of a user speaking a voice command, via information provided by the voice network (e.g., ANI, CPN, etc.), voice recognition, a dialog with the user(s), an out-of-band communication with the user(s), or the like.

The response module 126, meanwhile, may perform certain actions in response to recognizing different voice commands from an audio signal representing the audio of the voice communication. This may include outputting audio to one or both of the devices 104(1) and 104(2).

While FIG. 1 illustrates, the virtual-assistant module 110 residing on computing device(s) that are remote from the devices 104(1) and 104(2) (e.g., computing resources 108), in other instances the components of the virtual assistant module 110 may reside one or both of the user devices 104(1) and 104(2), on one or more other entities, or spread across multiple other locations.

Regardless of where the speech recognition occurs, the virtual assistant module 110 may receive vocal input from the users 102(1) and 102(2) and the speech-recognition engine 122 may perform speech recognition to interpret a user's operational request or command. The requests may be for essentially any type of operation, such as database inquires, requesting and consuming entertainment (e.g., gaming, finding and playing music, movies or other content, etc.), personal management (e.g., calendaring, note taking, etc.), online shopping, financial transactions, and so forth.

To provide an example, FIG. 1 illustrates the users 102(1) and 102(2) engaging in a voice communication, which the virtual assistant module 110 joins. At 128(1), the user 102(2) states the following: "I'm excited to fly there tomorrow. What is the temperature going to be?" In response, the user 102(1) states the following at 128(2): "I don't know. Virtual assistant, what is the temperature supposed to be tomorrow?" In this example, in response to identifying the predefined phrase "virtual assistant", the invocation module 120 invokes the speech-recognition engine 122, which identifies the voice command from 128(2). The speaker-ID module 124 identifies the user 102(1) using any of the techniques described above. The response module 126 then uses this identification to determine a geographical location at which to check the temperature (i.e., the location of the user 102(1)), checks the forecast for the following day at that location and, at 128(3), outputs the following to both devices: "The high temp in Seattle tomorrow is 72 degrees".

Figure 2A:
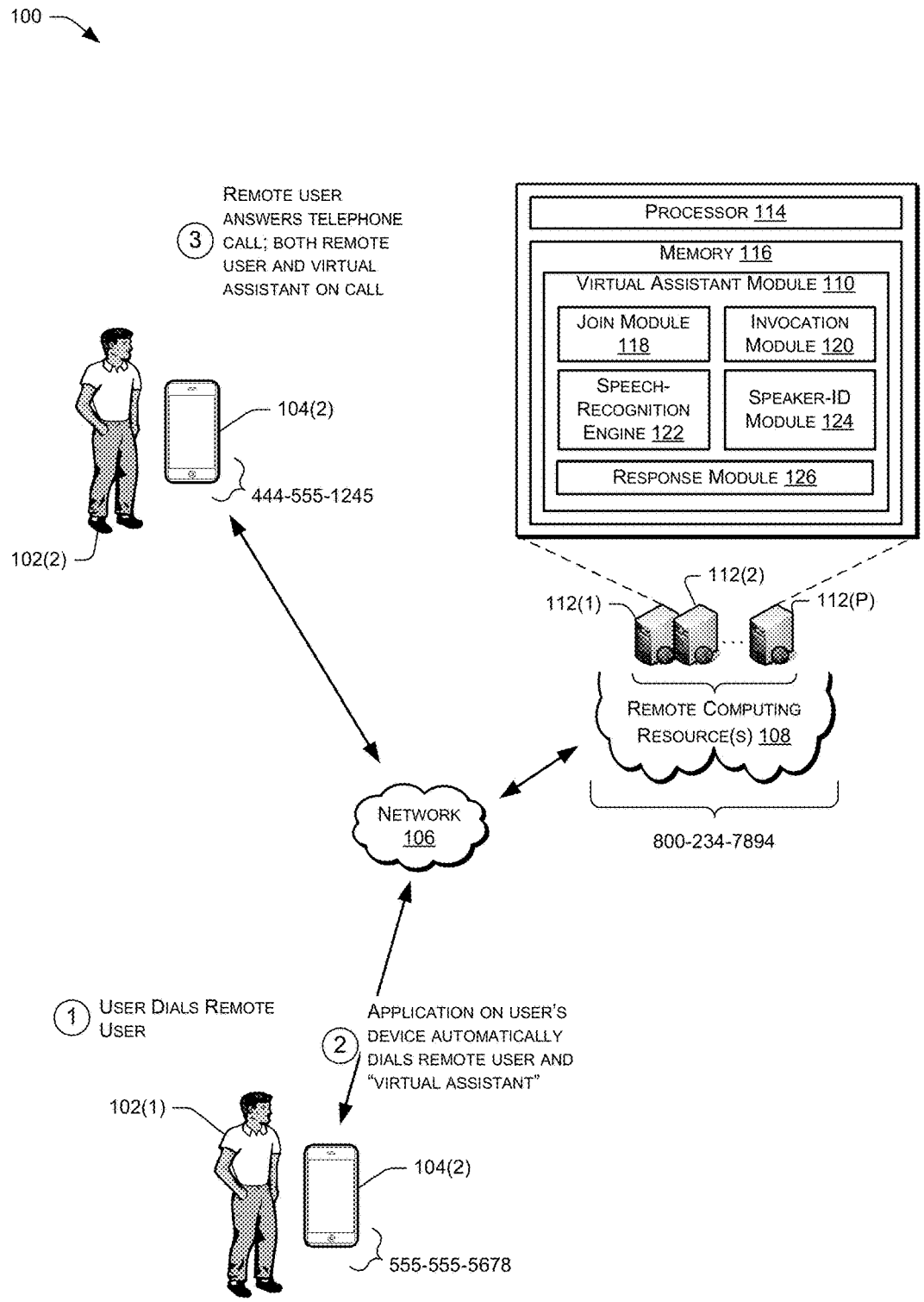
FIG. 2A illustrates an example sequence of the first user of FIG. 1 dialing the second user and an application on the device of the first user automatically dialing a telephone number associated with one or more computing devices that implement the virtual assistant.

FIG. 2A illustrates an example sequence of the user 102(1) dialing the user 102(2) and an application on the device 104(1) of the user 102(1) automatically dialing a telephone number or other endpoint identifier associated with the computing resources 108 that implement a virtual assistant. At "1", the user dials the telephone number associated with the device 104(2) of the user 102(2). At "2", the application (e.g., the virtual-assistant module 110) automatically dials both the telephone number associated with the device 104(2) (444-555-1245) and the telephone number associated with the virtual-assistant module 110 (800-234-7894). At "3", the user 102(2) answers the phone call and both the user 102(2) and the virtual assistant are now on the telephone call. The virtual assistant remains on the call awaiting invocation as described above and illustrated below with reference to FIG. 3.

Figure 2B:
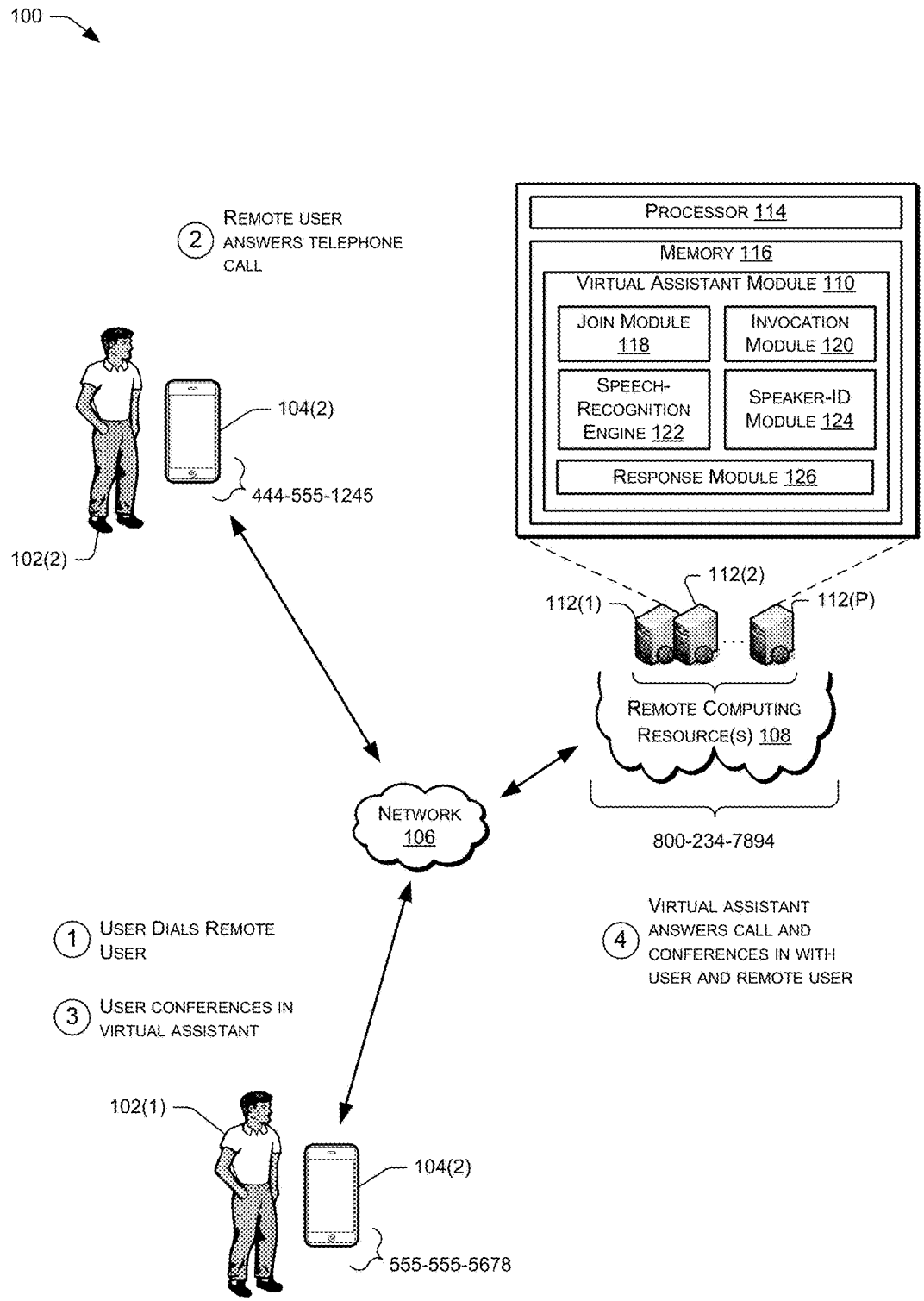
FIG. 2B illustrates an example sequence of the first user of FIG. 1 dialing the second user thereafter conferencing in the virtual assistant.

FIG. 2B illustrates another example sequence of the user 102(1) joining the virtual assistant module to the voice communication. At "1", the user 102(1) dials the telephone number associated with the device 104(2). At "2", the user 102(2) answers the call, establishing a voice communication between the device 104(1) and the device 104(2). At "3", the user 102(1) (or the user 102(2)) conferences in the virtual assistant module 110 by dialing the associated number. At "4", the virtual assistant answers the call and conferences into the voice communication, creating a multi-way conference call. In some instances, the virtual assistant may be automatically invoked in response to being joined to a call (regardless of whether the join occurs using the embodiment of FIG. 2A or 2B), while in other instances the virtual assistant may be joined but not invoked. Furthermore, while the illustrated examples describe two mobile devices along with the described with the virtual assistant, in some instances any number of user devices may be joined to the voice communication.

Figure 3:
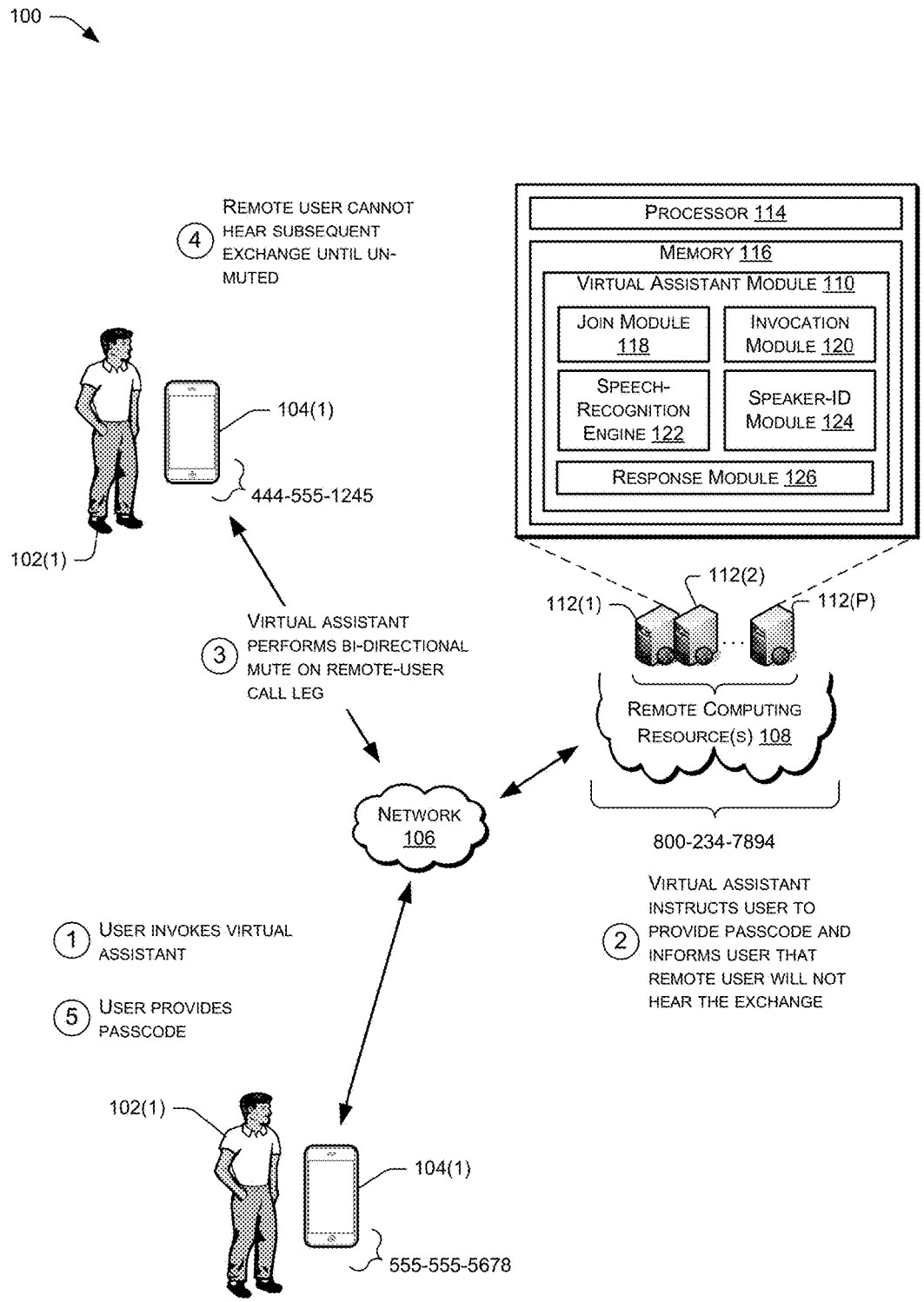
FIG. 3 illustrates an example sequence of the first user of FIG. 1 invoking the virtual assistant and one example of the virtual assistant of the identifying and authenticating the user.

FIG. 3 illustrates an example sequence of the user 102(1) invoking the virtual assistant and one example of the virtual assistant of the identifying and authenticating the user 102(1). At "1", the user 102(1) invokes a virtual assistant that has already joined a voice communication. This invocation may include the user 102(1) speaking a predefined utterance, selecting a predefined soft or physical button on the device 104(1), or the like. In the latter instances, the virtual assistant receives an indication of the selection of the button made by one of the users. At "2", the virtual assistant instructs the user 102(1) to provide a passcode of the user and may also inform the user 102(1) that the other user on the call (user 102(2)) will not hear the passcode exchange. At "3", the virtual assistant performs a bi-directional mute of the leg of the call corresponding to the user 102(2) such that the user 102(2) cannot hear the exchange between the virtual assistant and the user 102(1). At "4", the user 102(2) is in fact muted and cannot hear the exchange. Finally, at "5", the user 102(1) provides the passcode (e.g., audibly), which if correct may invoke the virtual assistant, causing the assistant to un-mute the leg of the call corresponding to the user 102(2) and causing the assistant to begin performing speech recognition on an audio signal representing audio from the voice communication for the purpose of identifying and responding to voice commands therein.

Figure 4:
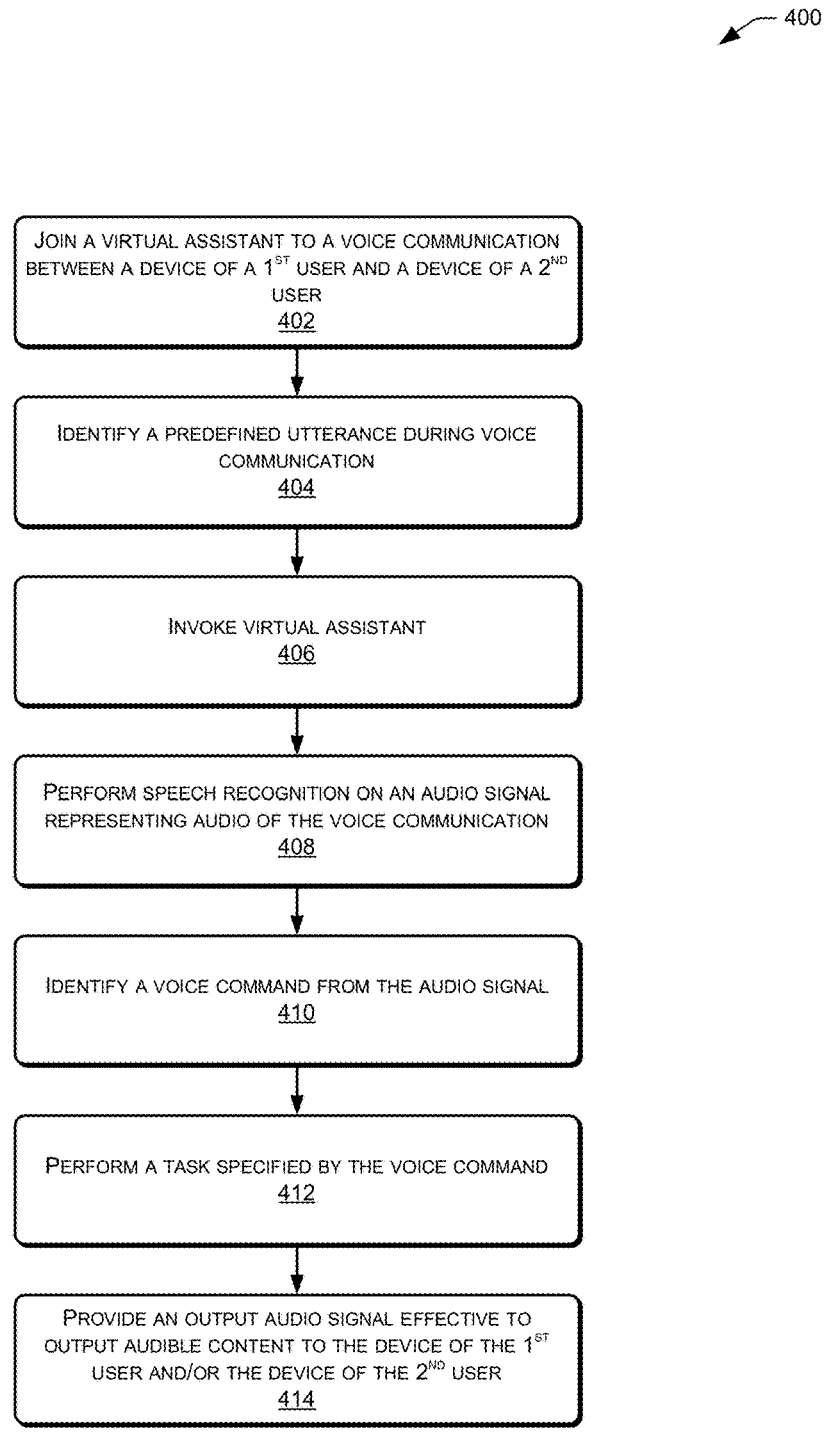
FIG. 4 depicts a flow diagram of an example process that a virtual assistant module may implement.

FIG. 4 depicts a flow diagram of an example process 400 that the virtual assistant module 110 may implement. Each process described herein is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The process 400 includes, at 402, joining a virtual assistant to a voice communication established between a device of a first user and a device of a second user. At 404, the virtual assistant may identify a predefined utterance from within audio of the voice communication and, in response, may invoke itself at 406, thus readying itself to identify subsequent voice commands within the audio of the voice communication.

At 408, the virtual assistant may begin performing speech recognition on an audio signal representing audio of the voice communication, given that the virtual assistant has been invoked. At 410, the assistant may identify a voice command from the audio signal representing the audio. In response, the virtual assistant may, at 412, perform a task associated with the voice command and may provide an audio signal effective to output audible content to both user devices at 414. For instance, the virtual assistant may identify a temperature and output the temperature, purchase an item and output an indication of the purchase, schedule an appointment and output a time, date, and location of the meeting, or the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors; and
one or more computer-readable media storing computer-executable instructions that, when executed by the one or more processors, cause the one or more processors to perform acts comprising:
receiving an indication that a first device of a first user and a second device of a second user are exchanging first voice-communication data;
establishing a connection between the first device, the second device, and a computing device hosting at least a portion of a virtual assistant based at least in part on the indication;
receiving, by the computing device, the first voice-communication data exchanged between the first device and the second device, the computing device being remote from both the first device and the second device, wherein the computing device is configured to communicate with the first device over one or more networks and configured to communicate with the second device over the one or more networks;
performing speech recognition on a first part of a first audio signal to generate first text, the first audio signal representing first audio of the first voice-communication data exchanged between the first device and the second device;
identifying a predefined utterance in the first text;
invoking the virtual assistant based at least in part on identifying the predefined utterance;
receiving identity information associated with the first device;
transmitting, to the first device and at least partially in response to invoking the virtual assistant, information indicating that second voice-communication data will not be transmitted to the second device;
transmitting, to the first device, a request for a password, the request based at least in part on the identity information;
receiving the second voice-communication data from the first device including a representation of the password;
preventing, based at least in part on the request for the password, the second voice-communication data from being transmitted to the second device;
determining that the representation of the password is associated with an identity of the first user;
receiving third voice-communication data exchanged between the first device and the second device, the third voice-communication data received subsequent to the first voice-communication data and the second voice-communication data;

at least partly in response to identifying the predefined utterance, performing speech recognition on a second audio signal to generate second text, the second audio signal representing second audio of the third voice-communication data exchanged between the first device and the second device;

identifying a voice command in the second text, the voice command being separate from and occurring after the predefined utterance;

performing a task corresponding to the voice command at least partly in response to identifying the voice command; and sending an output audio signal to at least one of the first device or the second device, the output audio signal configured to cause audible output associated with the performing of the task on at least one of the first device or the second device.

2. A system as recited in claim 1, wherein:

the voice command comprises a request for information;

the performing of the task comprises locating, as located information, the information; and the sending of the output audio signal comprises sending a signal configured to cause the virtual assistant to state, to the first user and the second user, the located information.

3. A system as recited in claim 1, wherein the first device, the second device, and the computing device are connected via a conference call.

4. A system as recited in claim 1, wherein the computing device is associated with a telephony service that establishes voice communication between the first user and the second user.

5. A system as recited in claim 1, the second audio associated with the third voice-communication data including a first part and a second part, the second text corresponding to the first part of the second audio signal, the acts further comprising, after sending the output audio signal to the at least one of the first device or the second device, refraining from performing speech recognition on the second part of the second audio signal, the second part being subsequent to the first part.

6. A system as recited in claim 1, wherein the information indicating that second voice-communication data will not be transmitted to the second device includes at least data generated using text to speech.

7. A system as recited in claim 1, wherein the identity information associated with the first device is based at least in part on a telephone number associated with the first device, a uniform resource identifier associated with the first device, a voice over internet protocol (VoIP) identifier associated with the first device, or a session initiation protocol (SIP) identifier associated with the first device.

8. A method comprising:

at a computing device hosting at least a portion of a virtual assistant:

receiving first voice-communication data exchanged between a first device of a first user and a second device of a second user, the computing device being remote from both the first device and the second device;

performing speech recognition on a first audio signal to generate first text, the first audio signal representing first audio of the first voice-communication data exchanged between the first device and the second device;

identifying a predefined utterance in the first text;

invoking the virtual assistant based at least in part on identifying the predefined utterance;

receiving identity information associated with the first device;

transmitting, to the first device and at least partially in response to invoking the virtual assistant, information indicating that second voice-communication data will not be transmitted to the second device;

transmitting a request for a password to the first device, the request based at least in part on the identity information;

receiving the second voice-communication data from the first device including a representation of the password;

preventing, based at least in part on the request for the password, the second voice-communication data from being transmitted to the second device;

determining that the representation of the password is associated with an identity of the first user;

receiving third voice-communication data exchanged between the first device and the second device, the third voice-communication data received subsequent to the first voice-communication data and the second voice-communication data;

at least partly in response to identifying the predefined utterance in the first text, performing speech recognition on a second audio signal to generate second text, the second audio signal representing second audio of the third voice-communication data exchanged between the first device and the second device;

identifying, from the second text, a voice command uttered by at least one of the first user or the second user, the voice command being separate from and occurring after the predefined utterance;

performing a task corresponding to the voice command at least partly in response to identifying the voice command; and sending, over one or more networks, an output audio signal to the first device and the second device, wherein the output audio signal is associated with the performing the task corresponding to the voice command.

9. A method as recited in claim 8, further comprising identifying a user that provided the voice command, and wherein audible content associated with the output audio signal is based at least in part on the identifying the user.

10. A method as recited in claim 9, wherein the identifying the user comprises:

referencing at least one of an automatic number identification (ANI) indicating a telephone number associated with the first device that initiated a voice communication including at least the first voice-communication data or a called party number (CPN) indicating a telephone number associated with the second device that received a request to establish the voice communication.

11. A method as recited in claim 9, wherein the identifying the user comprises comparing at least one of frequency, amplitude, pitch, or another audio characteristic of speech of the first user or the second user to one or more pre-stored voice signatures.

12. A method as recited in claim 9, wherein the transmitting the request for the password to the first device is based at least in part on determining that the first user uttered the predefined utterance to invoke the virtual assistant.

13. A method as recited in claim 8, further comprising the virtual assistant communicating with the first user via the second voice-communication data while preventing fourth voice-communication data associated with the second device from being transmitted to the first device.

14. A method as recited in claim 8, the second audio associated with the third voice-communication data including a first part and a second part, the second text corresponding to the first part of the second audio signal, the method further comprising, after sending the output audio signal to the first device and the second device, refraining from performing speech recognition on the second part of the second audio signal, the second part being subsequent to the first part.

15. A method as recited in claim 8, further comprising converting, as the information indicating that the second voice-communication data will not be transmitted to the second device, text to speech, the text corresponding to the information.

16. One or more non-transitory computer-readable media storing computer-executable instructions that, when executed by one or more processors, cause the one or more processors to perform acts comprising:
   receiving an indication that two user devices are exchanging first voice-communication data;
   receiving, by a computing device, the first voice-communication data exchanged between the two user devices, the computing device being remote from the two user devices, the two user devices including a first device and a second device;
   performing speech recognition by the computing device on a first audio signal representing first audio of the first voice-communication data to identify a predefined utterance;
   invoking a virtual assistant based at least in part on the predefined utterance;
   receiving identity information associated with the first device;
   transmitting, to the first device and at least partially in response to invoking the virtual assistant, information indicating that second voice-communication data will not be transmitted to the second device;
   transmitting, to the first device, a request for a password, the request based at least in part on the identity information;
   receiving the second voice-communication data from the first device including a representation of the password;
   preventing, based at least in part on the request for the password, the second voice-communication data from being transmitted to the second device;
   determining that the representation of the password is associated with an identity of a first user associated with the first device;
   receiving third voice-communication data exchanged between the first device and the second device, the third voice-communication data received subsequent to the first voice-communication data and the second voice-communication data;
   performing speech recognition on a second audio signal to generate text, the second audio signal representing second audio of the third voice-communication data exchanged between the first device and the second device;
   identifying, from the text, a voice command from a user of one of the two user devices, the voice command being separate from and occurring after the predefined utterance;
   performing a task corresponding to the voice command at least partly in response to identifying the voice command; and
   sending, over one or more networks, an output audio signal to the two user devices, wherein the output audio signal is associated with the performing the task corresponding to the voice command.

17. One or more non-transitory computer-readable media as recited in claim 16, the acts further comprising performing the task corresponding to the voice command at least partly in response to the identifying of the voice command.

18. One or more non-transitory computer-readable media as recited in claim 16, the acts further comprising sending, to at least one of the two user devices at least partly in response to the identifying of the voice command or at least partly in response to performing the task corresponding to the voice command, the output audio signal effective to output audible content.

19. One or more non-transitory computer-readable media as recited in claim 16, wherein at least the first voice-communication data is exchanged over a public switched telephone network (PSTN), a cellular network, or a voice-over-internet-protocol (VoIP) network.

20. One or more non-transitory computer-readable media as recited in claim 16, the acts further comprising converting, as the information indicating that the second voice-communication data will not be transmitted to the second device, text to speech, the text corresponding to the information.

* * * * *